United States Patent
Sasaki et al.

(10) Patent No.: US 10,471,943 B2
(45) Date of Patent: Nov. 12, 2019

(54) VEHICLE BRAKE HYDRAULIC PRESSURE CONTROL APPARATUS AND METHOD FOR MANUFACTURING THE SAME

(71) Applicant: NISSIN KOGYO CO., LTD., Ueda, Nagano (JP)

(72) Inventors: Kosuke Sasaki, Nagano (JP); Keita Murai, Nagano (JP); Takaomi Shirase, Nagano (JP); Tetsuo Sasaki, Nagano (JP)

(73) Assignee: AUTOLIV NISSIN BRAKE SYSTEMS JAPAN CO., LTD., Nagano (JP)

( * ) Notice: Subject to any disclaimer, the term of this patent is extended or adjusted under 35 U.S.C. 154(b) by 31 days.

(21) Appl. No.: 14/285,016

(22) Filed: May 22, 2014

(65) Prior Publication Data

US 2014/0346855 A1 Nov. 27, 2014

(30) Foreign Application Priority Data

May 24, 2013 (JP) .................................. 2013-109519

(51) Int. Cl.
*B60T 8/36* (2006.01)
*B23P 15/00* (2006.01)

(52) U.S. Cl.
CPC ............ *B60T 8/363* (2013.01); *B23P 15/001* (2013.01); *B60T 8/368* (2013.01); *Y10T 29/49412* (2015.01)

(58) Field of Classification Search
CPC ...... B60T 8/363; B60T 8/3675; B60T 15/028; F16K 31/0655; F16K 31/0658;

(Continued)

(56) References Cited

U.S. PATENT DOCUMENTS 5,409,304 A  4/1995 Goossens
5,865,213 A * 2/1999 Scheffel .................. B60T 8/363
                                                        137/596.17

(Continued)

FOREIGN PATENT DOCUMENTS

DE  102006027859 A1 * 10/2007 .............. B60T 8/363
JP  2002503589  2/2002

(Continued)

OTHER PUBLICATIONS

Voss (DE 102006027859), Translation.*

(Continued)

*Primary Examiner* — Bradley T King
*Assistant Examiner* — Stephen M Bowes
(74) *Attorney, Agent, or Firm* — Andrew M. Calderon; Roberts Mlotkowski Safran Cole & Calderon, P.C.

(57) ABSTRACT

A vehicle brake hydraulic pressure control apparatus includes a base body and a solenoid valve. The solenoid valve is attached to an attachment hole which opens on one surface of the base body. A plurality of press-fitting portions that are press-fitted to an inner peripheral surface of the attachment hole are provided on an outer peripheral surface of the solenoid valve at an interval in a hole axis direction. Contact lengths, in the hole axis direction, between the inner peripheral surface of the attachment hole and two of the press-fitting portions are different from each other.

15 Claims, 8 Drawing Sheets

(58) Field of Classification Search
CPC .... F16K 27/029; F16K 31/02; F16K 31/0624; F16K 31/0675; Y10T 29/49314; Y10T 29/49945; B23P 15/001
USPC ........................ 29/890.124; 137/315.03, 884; 251/129.02, 129.03, 129.15
See application file for complete search history.

(56) References Cited

U.S. PATENT DOCUMENTS

| | | | |
|---|---|---|---|
| 5,887,624 A * | 3/1999 | Taniguchi | B60T 8/363 137/596.17 |
| 6,405,752 B1 | 6/2002 | Fritsch et al. | |
| 6,742,764 B1 * | 6/2004 | Volz | B60T 8/363 251/129.02 |
| 2005/0218364 A1 * | 10/2005 | Ohi | B60T 8/363 251/129.15 |
| 2008/0093915 A1 | 4/2008 | Ota et al. | |
| 2012/0001107 A1 * | 1/2012 | Tominaga | B60T 8/3615 251/129.15 |
| 2012/0267555 A1 * | 10/2012 | Dinerman | B60T 8/3615 251/129.15 |
| 2013/0105715 A1 * | 5/2013 | Kim | B60T 8/363 251/129.15 |
| 2014/0048732 A1 * | 2/2014 | Heyer | B60T 8/363 251/129.15 |

FOREIGN PATENT DOCUMENTS

| | | | |
|---|---|---|---|
| JP | A-2006242321 | 9/2006 | |
| JP | 2008094322 | 4/2008 | |
| JP | 2013515220 | 5/2013 | |
| WO | WO-9942348 | 6/1999 | |
| WO | WO 2011076471 A1 * | 6/2011 | ............. B60T 8/363 |
| WO | WO-2011076484 | 6/2011 | |

OTHER PUBLICATIONS

Japanese Office Action for related JP Application No. 2013109519, dated Mar. 16, 2015, 4 pages.
European Search Report for related EP application No. 14169626, dated Feb. 26, 2015, 7 pp.

* cited by examiner

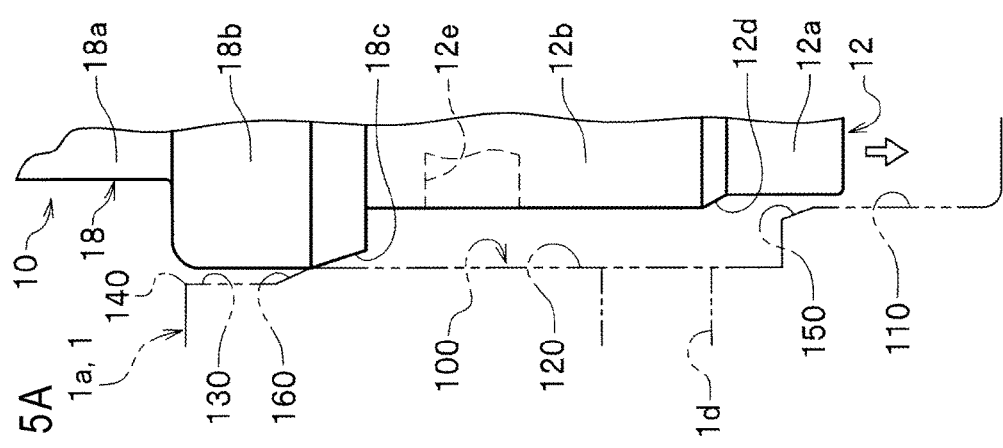

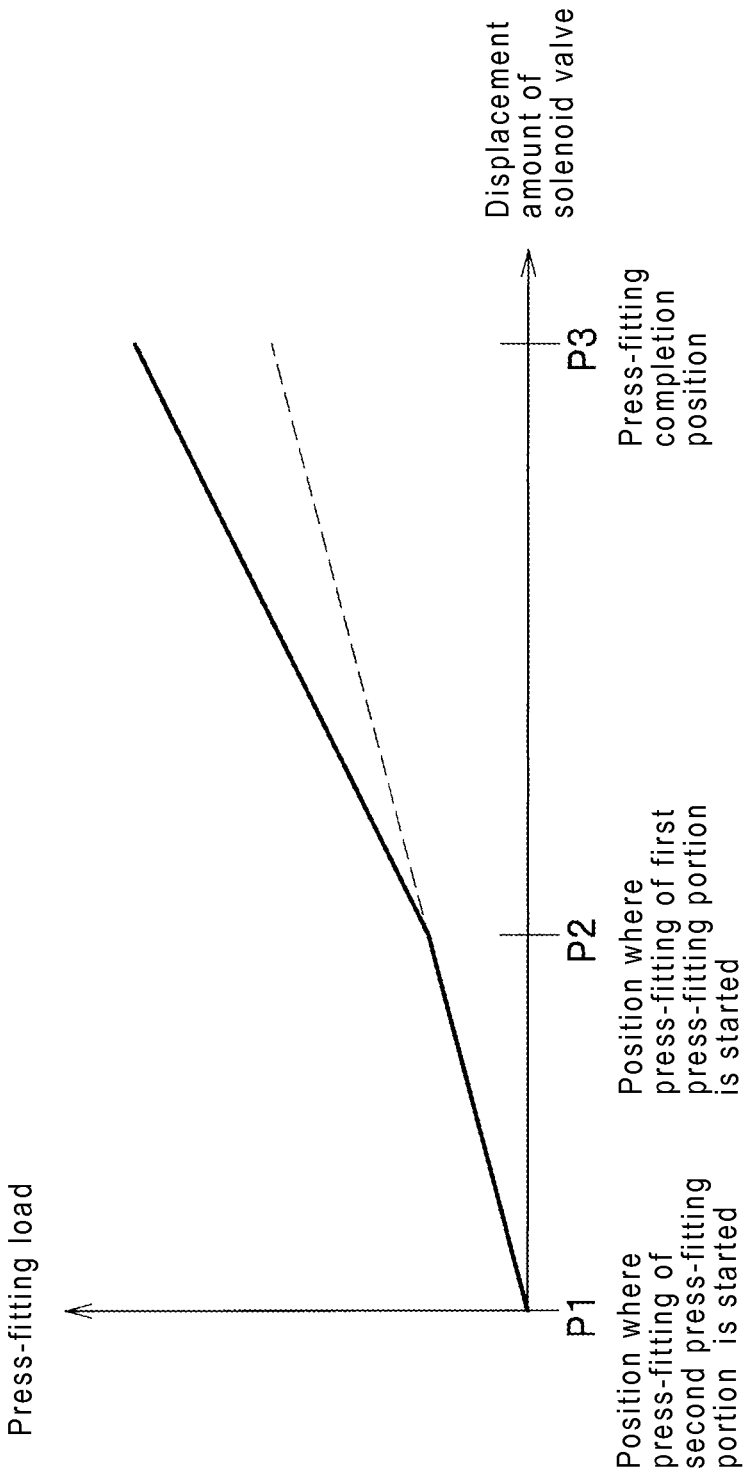

VEHICLE BRAKE HYDRAULIC PRESSURE CONTROL APPARATUS AND METHOD FOR MANUFACTURING THE SAME

CROSS REFERENCE TO RELATED APPLICATION

This application is based on and claims priority under 35 U.S.C. § 119 to Japanese Patent Application No. 2013-109519 (filed on May 24, 2013), the entire contents of which are incorporated herein by reference.

BACKGROUND

Field

The invention relates to a vehicle brake hydraulic pressure control apparatus and a method for manufacturing the vehicle brake hydraulic pressure control apparatus.

Related Art

For example, JP 2008-094322 A (corresponding to US 2008/0093915 A) describes a method for manufacturing a vehicle brake hydraulic pressure control apparatus, including a step of sealing a space between an attachment hole and a solenoid valve by press-fitting the solenoid valve into the attachment hole of a base body and a step of sealing the space between the attachment hole and the solenoid valve by plastically deforming an opening portion of the attachment hole so as to clamp the solenoid valve.

SUMMARY

In the manufacturing method described in JP 2008-094322 A, the work for sealing the space between the attachment hole and the solenoid valve is divided into the two steps (press fitting and caulking). Thus, the manufacturing process is complicated.

The invention has been made in view of the above circumstances. The invention provides a vehicle brake hydraulic pressure control apparatus which can simplify a manufacturing process and can reliably seal the space between an attachment hole and a solenoid valve, as well as its manufacturing method and its manufacturing management method.

(1) According to one aspect of the invention, a vehicle brake hydraulic pressure control apparatus includes a base body and a solenoid valve. The solenoid valve is attached to an attachment hole which opens on one surface of the base body. A plurality of press-fitting portions that are press-fitted to an inner peripheral surface of the attachment hole are provided on an outer peripheral surface of the solenoid valve at an interval in a hole axis direction. Contact lengths, in the hole axis direction, between the inner peripheral surface of the attachment hole and two of the press-fitting portions are different from each other.

With this configuration, the solenoid valve is attached to the attachment hole by moving the solenoid valve inserted in the attachment hole toward the inside of the base body and thereby press-fitting the press-fitting portions into the attachment hole sequentially. In this manner, the space between the attachment hole and the solenoid valve can be sealed by the plural press-fitted parts only by the work of moving the solenoid valve toward the inner side of the base body.

Also, the press-fitting portions start to be press-fitted at different points in time. Therefore, the press-fitting load that is applied to the solenoid valve can be dispersed.

The press-fitting load that is applied to the solenoid valve varies greatly when each press-fitting portion starts to be press-fitted. Therefore, the state of press-fitting of each press-fitting portion into the attachment hole can be managed based on such a variation of the press-fitting load.

(2) In the apparatus of (1), a communication hole that communicates with a fluid line of the base body may open on the outer peripheral surface of the solenoid valve. Also, the two of the press-fitting portions may be disposed across an opening portion of the communication hole.

This configuration makes reliable sealing around a region where the communication hole of the solenoid valve communicates with the fluid line of the base body.

(3) In the apparatus of (1), hole guide portions may be provided on the inner peripheral surface of the attachment hole. Also, a diameter of each hole guide portion may get larger as the position goes from a press-fitting region of the corresponding press-fitting portion toward the one surface of the base body.

With this configuration, the solenoid valve is guided by each hole guide portion immediately before being press-fitted. As a result, the solenoid valve can be introduced to each press-fitting region smoothly and hence can be press-fitted into the attachment hole stably.

(4) In the apparatus of (3), the contact length between the inner peripheral surface of the attachment hole and one of the two of the press-fitting portions may be larger than that between the inner peripheral surface of the attachment hole and the other of the two of the press-fitting portions and may be smaller than a value obtained by adding (i) the contact length between the inner peripheral surface of the attachment hole and the other of the two of the press-fitting portions and (ii) a length, in the hole axis direction, of the hole guide portion corresponding to the other of the two of the press-fitting portions.

With this configuration, when the one press-fitting portion is placed at its press-fitting start position, a head portion of the other press-fitting portion is already located in the corresponding hole guide portion. As a result, the one press-fitting portion can be press-fitted into the attachment hole while a portion, on the other press-fitting portion side, of the solenoid valve is kept stable with respect to the attachment hole.

(5) In the apparatus of any one of (1) to (4), valve guide portions may be provided on the outer peripheral surface of the solenoid valve. A diameter of each valve guide portion gets smaller as the position goes from the corresponding press-fitting portion toward an inner side of the base body.

With this configuration, the solenoid valve is guided by each valve guide portion immediately before being press-fitted. As a result, the solenoid valve can be introduced to each press-fitting region smoothly and hence can be press-fitted into the attachment hole stably.

(6) In the apparatus of (5), the contact length between the inner peripheral surface of the attachment hole and one of the two of the press-fitting portions may be larger than that between the inner peripheral surface of the attachment hole and the other of the two of the press-fitting portions and may be smaller than a value obtained by adding (i) the contact length between the inner peripheral surface of the attachment hole and the other of the two of the press-fitting portions and (ii) a length, in the hole axis direction, of the valve guide portion corresponding to the other of the two of the press-fitting portions.

With this configuration, when the one press-fitting portion is placed at its press-fitting start position, a head portion of the corresponding valve guide portion is already located in the region where the other press-fitting portion is to be press-fitted. As a result, the one press-fitting portion can be press-fitted into the attachment hole while a portion, on the other press-fitting portion side, of the solenoid valve is kept stable with respect to the attachment hole.

(7) In the apparatus of any one of (1) to (6), the contact length between the inner peripheral surface of the attachment hole and one, being located on a bottom-portion side of the attachment hole, of the two of the press-fitting portions may be smaller than that between the inner peripheral surface of the attachment hole and the other, being located on an opening-portion side of the attachment hole, of the two of the press-fitting portions.

With this configuration, the press-fitting portion located on the bottom side of the attachment hole is press-fitted into the attachment hole after a start of press-fitting of the press-fitting portion located on the opening side of the attachment hole. As a result, a bottom-side portion of the solenoid valve can be press-fitted into the attachment hole while an opening-side portion of the press-fitting portion is kept stable with respect to the attachment hole.

(8) In the apparatus of any one of (1) to (7), the solenoid valve may include a valve housing and a cylindrical cover member. The valve housing is inserted into the attachment hole. The cylindrical cover member covers the housing. An opening end portion of the cover member is inserted into the attachment hole. At least one of the press-fitting portions is formed on an outer peripheral surface of the cover member.

With this configuration, the cover member can be press-joined to the valve housing using a press-fitting load which is applied to the solenoid valve to press-fit it into the attachment hole. Therefore, the cover member can be fixed to the valve housing reliably without the need for using a separate fixing means such as welding.

(9) According to another aspect of the invention, a method for manufacturing a vehicle brake hydraulic pressure control apparatus including a base body and a solenoid valve that is attached to an attachment hole which opens on one surface of the base body, wherein a plurality of press-fitting portions are provided on an outer peripheral surface of the solenoid valve at an interval in a hole axis direction, the method includes inserting the solenoid valve into the attachment hole and moving the solenoid valve toward an inner side of the base body, to press fit the press-fitting portions to the attachment portion sequentially.

With this method, the space between the attachment hole and the solenoid valve can be sealed by plural press-fitted parts only by the work of moving the solenoid valve toward the inner side of the base body.

Also, the press-fitting portions start to be press-fitted at different time points. Therefore, the press-fitting load that is applied to the solenoid valve can be dispersed.

An increase rate of the press-fitting load that is applied to the solenoid valve with respect to the displacement amount of the solenoid valve varies greatly when each press-fitting portion starts to be press-fitted. Therefore, the state of press-fitting of each press-fitting portion into the attachment hole can be managed based on such a variation of the press-fitting load.

(10) In the method of (9), during the inserting of the solenoid into the attachment hole and the sequentially press-fitting of the press-fitting portions to the attachment hole, (i) a first measurement value obtained by measuring a press-fitting load applied to the solenoid valve when one of the press-fitting portions is being press-fitted to the attachment hole and (ii) a second measurement value obtained by measuring the press-fitting load applied to the solenoid valve when another one of the press-fitting portions is being press-fitted to the attachment hole following the one of the press-fitting portions may be compared.

As the solenoid valve having the plural press-fitting portions is press-fitted into the attachment hole, the increase rate of the press-fitting load that is applied to the solenoid valve with respect to the displacement amount of the solenoid valve varies greatly when each press-fitting portion starts to be press-fitted. For example, in a line graph showing a relationship between the displacement amount of the solenoid valve and the press-fitting load, the gradient of the line increases when each press-fitting portion starts to be press-fitted. Assume that a comparison is made between a press-fitting load that is obtained when one press-fitting portion is press-fitted into the attachment hole and a press-fitting load that is obtained when another press-fitting portion is press-fitted into the attachment hole after the press-fitting of the one press-fitting portion. If the difference (variation amount) between the two press-fitting loads is larger than or equal to a setting value, it means that the two press-fitting portions have been press-fitted into the attachment hole at preset press-fitting loads. In this manner, the state of press-fitting of each press-fitting portion into the attachment hole can be managed based on a variation of the press-fitting load.

A vehicle brake hydraulic pressure control apparatus according to one embodiment of the invention can reliably seal the space between the attachment hole and the solenoid valve by plural press-fitted parts.

A manufacturing method of a vehicle brake hydraulic pressure control apparatus according to another embodiment of the invention makes it possible to set the solenoid valve in place in the attachment hole reliably by means of plural press-fitted parts only by the work of moving the solenoid valve toward the inside of the base body. A manufacturing process can thus be simplified.

BRIEF DESCRIPTION OF THE DRAWINGS

FIGS. 5A and 5B illustrate a manufacturing method according to the first embodiment, FIG. 5A is a side sectional view illustrating a stage that a second press-fitting portion is placed at its press-fitting start position, and FIG. 5B is a side sectional view illustrating a stage that a first press-fitting portion placed at its press-fitting start position;

FIG. 6 is a graph showing a relationship between a press-fitting load and a displacement amount in the manufacturing method;

FIG. 7A is a side sectional view at a stage that press-fitting of the first and second press-fitting portions has been completed, and FIG. 7B is a side sectional view at a stage that the second press-fitting portion is placed at its press-fitting start position; FIG. 8A is a side sectional view at a stage that press-fitting of the first and second press-fitting portions has been completed, and FIG. 8B is a side sectional view at a stage that the first press-fitting portion is placed at its press-fitting start position.

DETAILED DESCRIPTION

Embodiments of the invention will be described in detail with reference to the accompanying drawings.

In the description of the embodiments, the same constituent elements will be given the same reference symbol and will not be described redundantly.

First Embodiment

Figure 1:
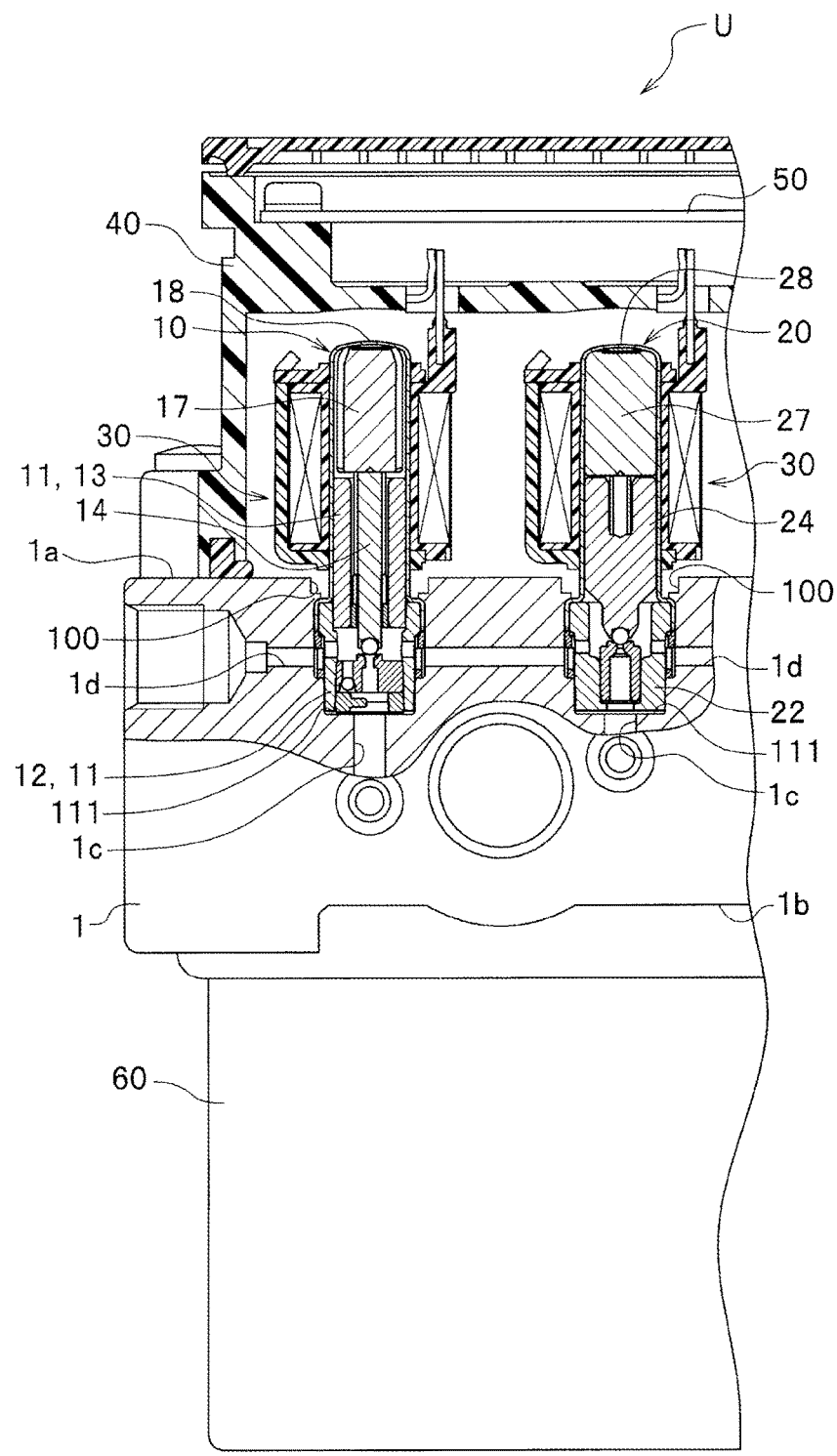
FIG. 1 is a partially sectional side view of a vehicle brake hydraulic pressure control apparatus according to a first embodiment.

A vehicle brake hydraulic pressure control apparatus U according to the first embodiment shown in FIG. 1 is one for use in a vehicle such as an automobile or a motorcycle. The vehicle brake hydraulic pressure control apparatus U enables various kinds of hydraulic pressure control such as antilock brake control and behavior stabilization control by properly controlling the brake hydraulic pressures that act on the wheel cylinders of wheel brakes.

The vehicle brake hydraulic pressure control apparatus U is equipped with a base body 1, a plurality of solenoid valves 10 and 20, a plurality of solenoids 30, a housing 40, a control board 50, and a motor 60. The solenoid valves 10 and 20 are attached to a upper surface 1a of the base body 1. The solenoids 30 surround the respective solenoid valves 10 and 20. The housing 40 is fixed to the upper surface 1a of the base body 1. The control board 50 is housed in the housing 40. The motor 60 is fixed to a lower surface 1b of the base body 1.

In the first embodiment, the configuration of the vehicle brake hydraulic pressure control apparatus U will be described in accordance with the orientation of the base body 1 that is in a state where the solenoid valves 10 and 20 are attached to the base body 1. Therefore, directions that will be employed in the following description do not necessarily coincide with corresponding directions that occur when the vehicle brake hydraulic pressure control apparatus U is mounted in a vehicle.

In each drawing, attachment holes 100 and the solenoid valves 10 and 20 are drawn schematically in shape as appropriate to facilitate understanding of their shapes.

Fluid lines 1c and 1d for connecting a master cylinder serving as a hydraulic pressure source and wheel cylinders are formed inside the base body 1.

The vehicle brake hydraulic pressure control apparatus U is configured so that the brake hydraulic pressures in the fluid lines 1c and 1d are varied when the control board 50 operates the solenoid valves 10 and 20 and the motor 60 in accordance with a behavior of the vehicle body.

The base body 1 is a metal component which has a substantially rectangular parallelepiped shape and which is mounted on a vehicle. The fluid lines 1c and 1d are formed inside the base body 1. The solenoid valves 10 and 20, a plunger pump (not shown), a reservoir (not shown), and other components are attached to the base body 1.

The upper surface 1a of the base body 1 is formed with the attachment holes 100 to which the respective solenoid valves 10 and 20 are attached. Each attachment hole 100 is a stepped cylindrical hole which has a bottom surface 111 and whose diameter increases step by step as the position goes toward the upper surface 1a from the inner side of the base body 1.

Figure 4A:
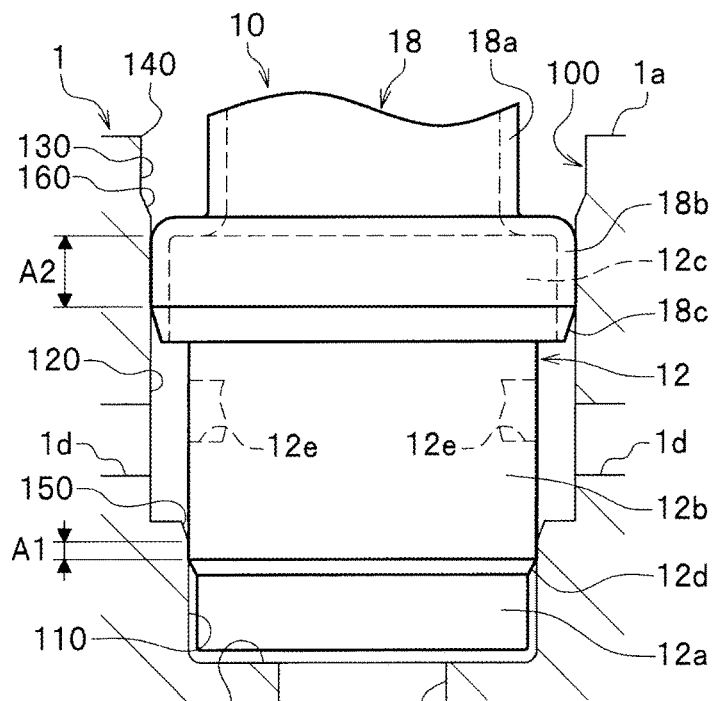
FIG. 4A is a side sectional view showing press-fitting portions of the normally open solenoid valve.

As shown in FIG. 4A, each attachment hole 100 has a bottom portion 110, an intermediate portion 120, an entrance portion 130, and an opening edge portion 140. The intermediate portion 120 is formed on an upper side of the bottom portion 110. The entrance portion 130 is formed on an upper side of the intermediate portion 120. The opening edge portion 140 opens on the upper surface 1a.

Also, a first hole guide portion 150 is formed between the bottom portion 110 and the intermediate portion 120. Furthermore, a second hole guide portion 160 is formed between the intermediate portion 120 and the entrance portion 130.

That is, each attachment hole 100 is formed so that the bottom portion 110, the first hole guide portion 150, the intermediate portion 120, the second hole guide portion 160, and the entrance portion 130 are provided continuously in this order from the bottom surface 111 to the opening edge portion 140.

The bottom portion 110 is the lowest (deepest) portion of the attachment hole 100. An opening of the fluid line 1c is formed at a center of the bottom surface 111.

The intermediate portion 120 is located on an upper side of the bottom portion 110 (on the opening edge portion 140 side). The hole diameter of the intermediate portion 120 is larger than that of the bottom portion 110. An opening of the fluid line 1d is formed in an inner peripheral surface of the intermediate portion 120.

The first hole guide portion 150 is a portion that extends from the top edge of the bottom portion 110 to the bottom edge of the intermediate portion 120. The inner peripheral surface of the first hole guide portion 150 is a tapered surface whose diameter increases gradually as the position goes from the bottom portion 110 toward the intermediate portion 120.

The entrance portion 130 is formed on an upper side of the intermediate portion 120 (on the opening edge portion 140 side). The hole diameter of the entrance portion 130 is larger than that of the intermediate portion 120.

The entrance portion 130 opens on the upper surface 1a. That is, an upper end portion of the entrance portion 130 constitutes the opening edge portion 140 of the attachment hole 100.

The second hole guide portion 160 is a portion that extends from the top edge of the intermediate portion 120 to the bottom edge of the entrance portion 130. The inner peripheral surface of the second hole guide portion 160 is a tapered surface whose diameter increases gradually as the position goes from the intermediate portion 120 toward the entrance portion 130.

Figure 2:
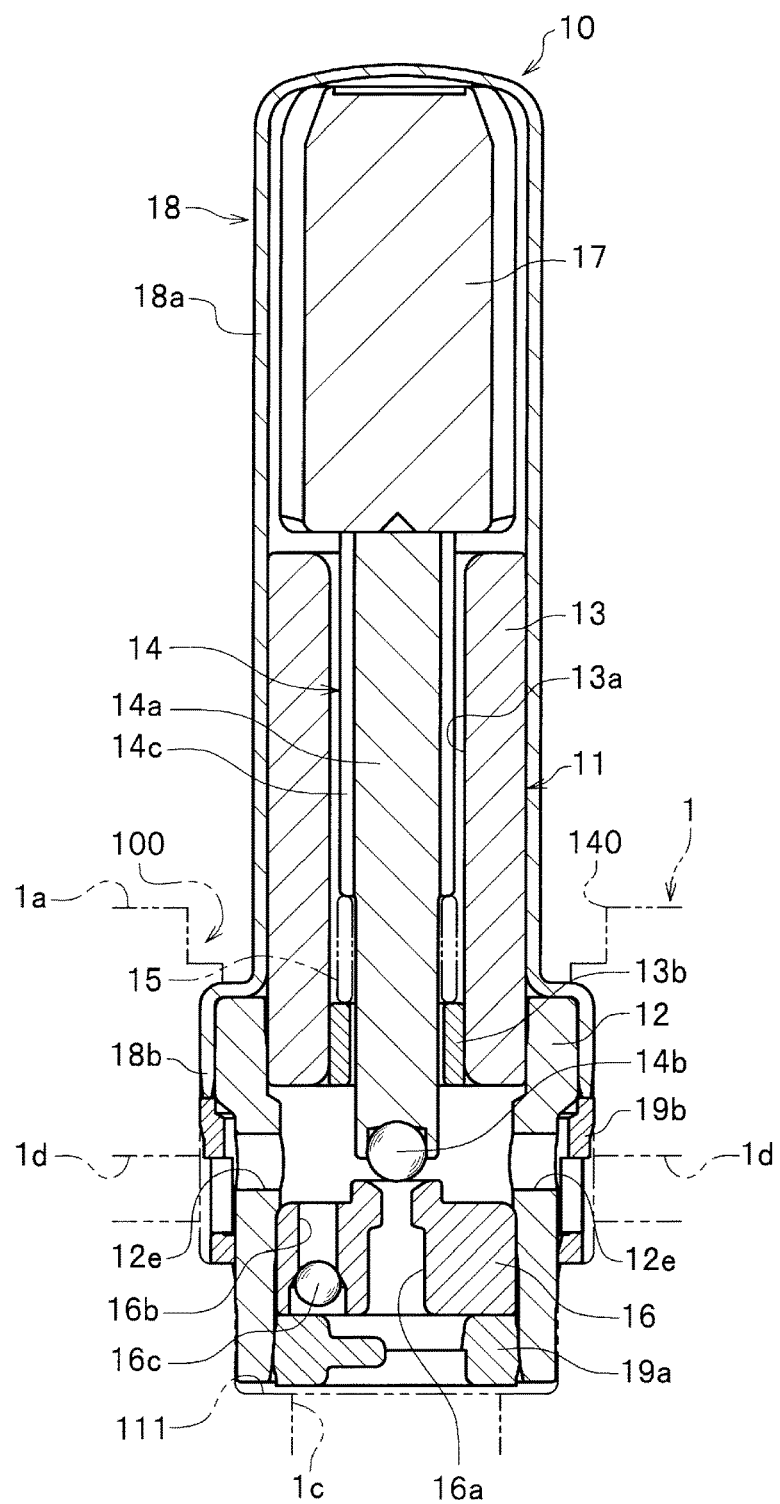
FIG. 2 is a side sectional view of a normally open solenoid valve according to the first embodiment.

As shown in FIG. 2, the normally open solenoid valve 10 is equipped with a cylindrical valve housing 11, a valve body member 14, a return spring 15, a valve seat member 16, a movable core 17, and a cover member 18. The valve housing 11 constitutes a fixed core. The valve body member 14 is inserted in the valve housing 11. The return spring 15 is housed in the valve housing 11. The valve seat member 16 is mounted in the valve housing 11. The movable core 17 is disposed on an upper side of the valve body member 14. The cover member 18 covers the movable core 17 and the valve housing 11.

The valve housing 11 is made of a magnetic material such as ion or an iron alloy. The valve housing 11 has an insertion portion 12 which is press-fitted into the attachment hole 100 and a protrusion portion 13 which projects from the attachment hole 100.

The insertion portion 12 is a stepped cylindrical component whose diameter increases step by step as the position goes upward.

As shown in FIG. 4A, the insertion portion 12 has a proximal portion 12a, a first press-fitting portion 12b formed on an upper side of the proximal portion 12a, and a cover attachment portion 12c formed on an upper side of the first press-fitting portion 12b. Also, a first valve guide portion 12d is formed between the proximal portion 12a and the first press-fitting portion 12b.

The proximal portion 12a is a portion inserted into the bottom portion 110 of the attachment hole 100 and is the lowermost portion of the insertion portion 12. The outer diameter of the proximal portion 12a is smaller than the hole diameter of the bottom portion 110.

The first press-fitting portion 12b is a portion which is press-fitted into the bottom portion 110 of the attachment hole 100. The first press-fitting portion 12b is formed on the upper side of the proximal portion 12a. Openings of communication holes 12e which communicate with the inside of the insertion portion 12 are formed in the outer peripheral surface of the first press-fitting portion 12b.

The outer diameter of the first press-fitting portion 12b is slightly larger than the hole diameter of the bottom portion 110.

When the first press-fitting portion 12b is press-fitted into the bottom portion 110, the outer peripheral surface of the first press-fitting portion 12b is press-joined to the inner peripheral surface of the bottom portion 110 over the entire circumference, whereby a press-fitted part having a contact length A1 is formed. This press-fitted part seals the space between the outer peripheral surface of the first press-fitting portion 12b and the inner peripheral surface of the bottom portion 110 liquid-tightly.

The first valve guide portion 12d is a portion which extends from the bottom edge of the first press-fitting portion 12b to the top edge of the proximal portion 12a. The outer peripheral surface of the first valve guide portion 12d is a tapered surface whose diameter decreases gradually as the position goes from the first press-fitting portion 12b toward the proximal portion 12a.

The cover attachment portion 12c is formed on the upper side of the first press-fitting portion 12b. The outer diameter of the cover attachment portion 12c is larger than that of the first press-fitting portion 12b.

The cover attachment portion 12c is a portion into which a second press-fitting portion 18b (described later) of the cover member 18 is fitted.

As shown in FIG. 2, the protrusion portion 13 is a cylindrical member which extends in up and down directions. A lower end portion of the protrusion portion 13 is press-fitted in the insertion portion 12. An upper portion of the protrusion portion 13 protrudes upward through the opening edge portion 140 of the attachment hole 100.

A cylindrical spring receiving member 13b is press-fitted into a lower end portion of a central hole 13a of the protrusion portion 13.

The valve body member 14 has a shaft portion 14a, which is circular in cross section and is inserted into the central hole 13a of the protrusion portion 13, and a valve body 14b which is a spherical body held by a lower end portion of the shaft portion 14a.

An upper half portion of the shaft portion 14a has a large diameter portion 14c. An upper end portion of the shaft portion 14a protrudes upward through an upper opening of the protrusion portion 13.

A lower portion of the shaft portion 14a is inserted through the spring receiving member 13b and protrudes downward through a lower opening of the protrusion portion 13.

The valve body 14b is held by the lower end portion of the shaft portion 14a so that a part of the valve body 14b protrudes from the lower end surface of the shaft portion 14a. The valve body 14b is inserted into a recess portion which is formed in the lower end surface of the shaft portion 14a. The valve body 14b is held by the shaft portion 14a by plastically deforming and clamping the portion outside the recess portion to the valve body 14b.

The return spring 15 is a coil spring and is housed in the central hole 13a of the protrusion portion 13. The return spring 15 surrounds the shaft portion 14a and is interposed between the spring receiving member 13b and the large diameter portion 14c of the shaft portion 14a in a compressed state. The valve body member 14 is pushed up with respect to the protrusion portion 13 by the urging force of the return spring 15.

The valve seat member 16 is disposed on a lower side of the shaft portion 14a and is press-fitted into a lower portion of the insertion portion 12.

A first flow passage 16a penetrates through a center portion of the valve seat member 16 in the up and down directions. A valve seat surface is formed at an upper opening edge portion of the first flow passage 16a. The first flow passage 16a is closed when the valve body 14b sits on the valve seat surface of the first flow passage 16a.

A second flow passage 16b penetrates through the valve seat member 16 in the up and down directions on one side of the first flow passage 16a. A spherical body 16c which is component of a one-way valve is housed in the second flow passage 16b.

The second flow passage 16b is closed by the spherical body 16c when the fluid pressure on a lower side of the spherical body 16c is higher than that on an upper side of the spherical body 16c. Conversely, the second flow passage 16b is opened when the fluid pressure on the upper side of the spherical body 16c is higher than that on the lower side of the spherical body 16c.

A first dust collection filter 19a is fitted to the insertion portion 12 and disposed on a lower side of the valve seat member 16. An annular second dust collection filter 19b is fitted onto the insertion portion 12. The second dust collection filter 19b covers the openings of the communication holes 12e.

The movable core 17, which is made of a magnetic material, is disposed on an upper side of the valve body member 14. The movable core 17 is normally pushed up by the valve body member 14. When the solenoid 30 (which will be described later) is excited, the movable core 17 is attracted by the valve housing 11 (which serves as a fixed core) and thereby moved downward to push down the valve body member 14.

The cover member 18 is a cylindrical member an upper end of which is closed. The cover member 18 has a housing portion 18a formed at an upper portion thereof a second press-fitting portion 18b formed at a lower portion thereof, and a second valve guide portion 18c (see FIG. 4A) which is formed at an opening end portion thereof.

The housing portion 18a covers the movable core 17 and the protrusion portion 13. A lower portion of the housing portion 18a is inserted into the attachment hole 100.

As shown in FIG. 4A, the second press-fitting portion 18b is formed on a lower side of the housing portion 18a. The second press-fitting portion 18b is a portion which is fitted onto the cover attachment portion 12c of the insertion portion 12 and is press-fitted into the intermediate portion 120 of the attachment hole 100.

The outer diameter of the second press-fitting portion 18b is larger than that of the housing portion 18a and is slightly larger than the intermediate portion 120.

When the second press-fitting portion 18b is press-fitted into the intermediate portion 120, the outer peripheral surface of the second press-fitting portion 18b is press-joined to the inner peripheral surface of the intermediate portion 120 over the entire circumference, whereby a press-fitted part having a contact length A2 is formed. This press-fitted part seals the space between the outer peripheral surface of the second press-fitting portion 18b and the inner peripheral surface of the intermediate portion 120 liquid-tightly.

When the second press-fitting portion 18b is press-fitted into the intermediate portion 120, the second press-fitting portion 18b is reduced in diameter and its inner peripheral surface is thereby press-joined to the outer peripheral surface of the insertion portion 12.

The second valve guide portion 18c is a portion which extends from the bottom edge of the second press-fitting portion 18b to the bottom edge of the cover member 18. The outer peripheral surface of the second valve guide portion 18c is a tapered surface whose diameter decreases gradually as the position goes from the second press-fitting portion 18b toward the bottom edge of the cover member 18.

As for the contact lengths A1 and A2 between the inner peripheral surface the attachment hole 100 and the first and second press-fitting portions 12b and 18b, in the first embodiment, the contact length A1 between the inner peripheral surface the attachment hole 100 and the first press-fitting portion 12b, which is located on the bottom portion side of the attachment hole 100 (i.e., the inner side of the base body 1), is smaller than the contact length A2 between the inner peripheral surface of the attachment hole 100 and the second press-fitting portion 18b, which is located on the opening portion side of the attachment hole 100 (i.e., the upper surface 1a side of the base body 1). That is, A1<A2.

With this structure, when the solenoid valve 10 is press-fitted into the attachment hole 100, the first press-fitting portion 12b starts to be fitted into the bottom portion 110 after the second press-fitting portion 18b started to be fitted into the intermediate portion 120.

That is, as shown in FIG. 5A, the interval between the first press-fitting portion 12b and the second press-fitting portion 18b in a hole axis direction are set so that first press-fitting portion 12b has not reached the bottom portion 110 yet when the second press-fitting portion 18b is placed at such a position as to start to be fitted into the intermediate portion 120.

In the above-described solenoid valve 10, as shown in FIG. 1, the solenoid 30 for driving the solenoid valve 10 is disposed around that a portion of the solenoid valve 10 which protrudes from the attachment hole 100.

The solenoid 30 is housed in the housing 40 with surrounding the solenoid valve 10. The solenoid 30 generates a magnetic field around the solenoid valve 10 when energized by the control board 50.

In the above-described normally open solenoid valve 10, when the solenoid 30 is excited, the movable core 17 shown in FIG. 2 is attracted by the valve housing 11 and thereby moved downward to push down the valve body member 14. As a result, the valve body 14b comes to sit on the valve seat surface of the valve seat member 16 and the first flow passage 16a is thereby closed.

When the excitation of the solenoid 30 is stopped, the valve body member 14 and the movable core 17 are returned upward by the urging force of the return spring 15, whereby the valve body 14b is separated from the valve seat member 16 and the first flow passage 16a is opened.

Figure 3:
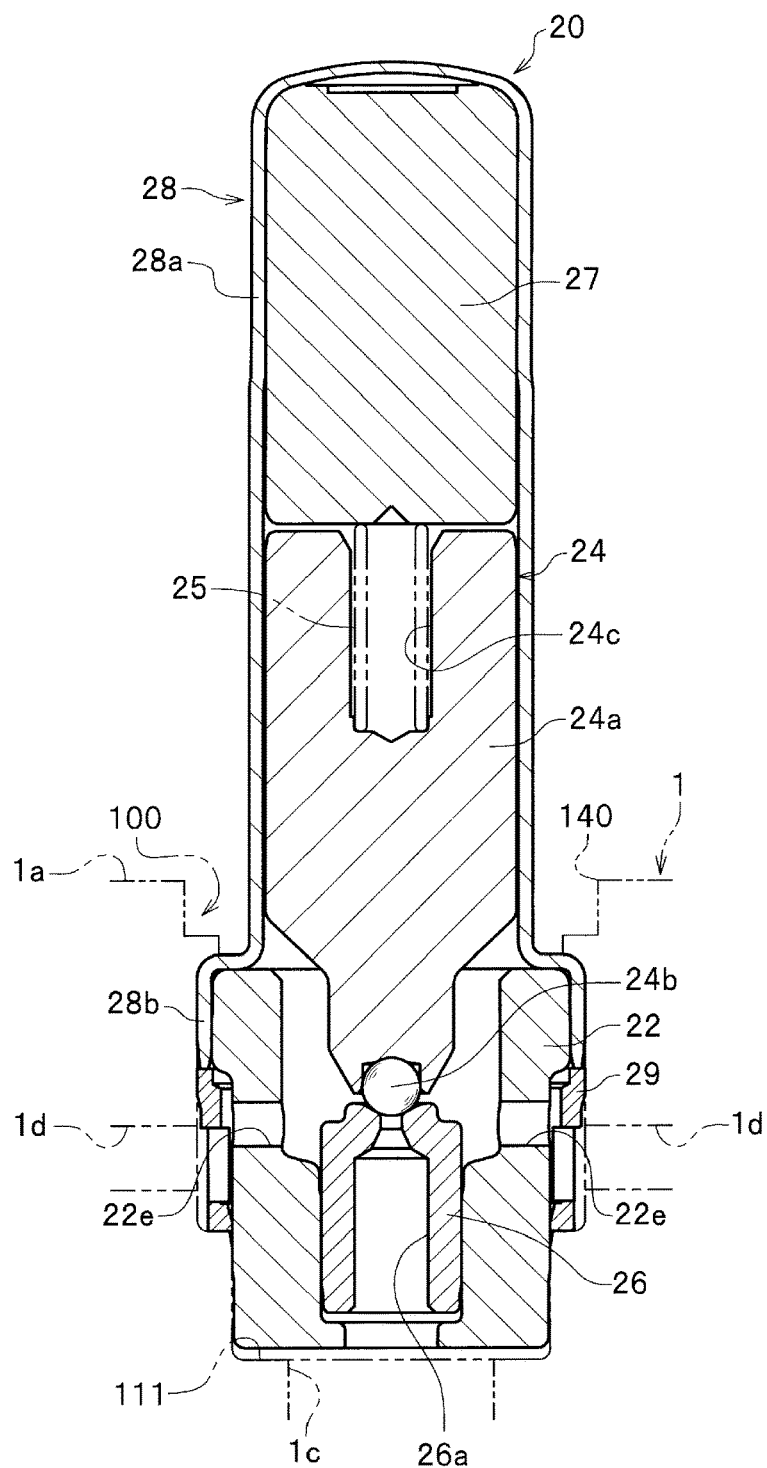
FIG. 3 is a side sectional view of a normally closed solenoid valve according to the first embodiment.

As shown in FIG. 3, the normally closed solenoid valve 20 is equipped with a cylindrical valve housing 22, a valve body member 24, a fixed core 27, a return spring 25, a valve seat member 26, and a cover member 28. The valve body member 24 constitutes a movable core. The fixed core 27 is disposed on an upper side of the valve body member 24. The return spring 25 is interposed between the valve body member 24 and the fixed core 27. The valve seat member 26 is mounted in the valve housing 22. The cover member 28 covers the fixed core 27 and the valve body member 24.

The valve housing 22, which is a stepped cylindrical component whose diameter increases step by step as the position goes upward, is press-fitted into the attachment hole 100.

The valve housing 22 has the same external shape as the insertion portion 12 of the normally open solenoid valve 10 (see FIG. 4A).

Figure 4B:
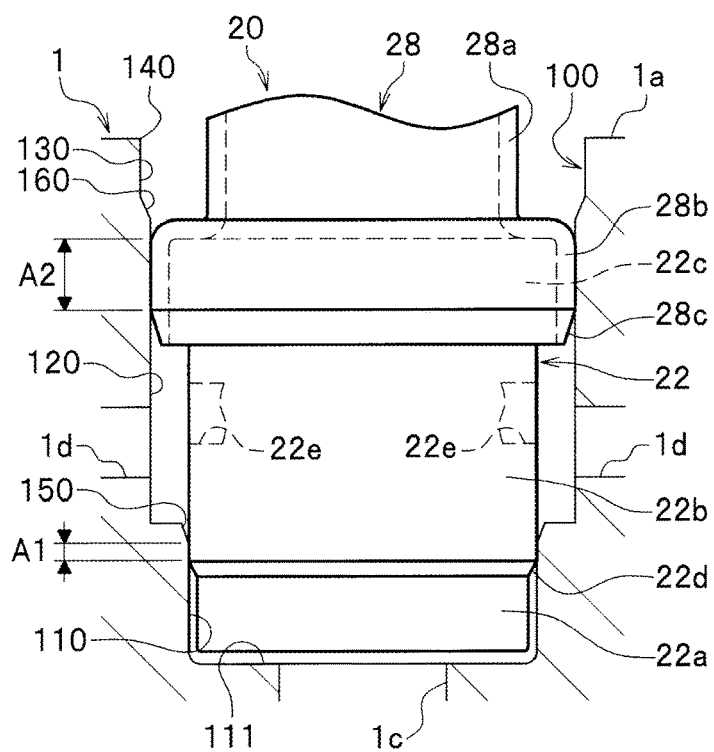
FIG. 4B is a side sectional view showing portions of the normally closed solenoid valve.

As shown in FIG. 4B, the valve housing 22 has a proximal portion 22a, a first press-fitting portion 22b formed on an upper side of the proximal portion 22a, and a cover attachment portion 22c formed on an upper side of the first press-fitting portion 22b. Also, a first valve guide portion 22d is formed between the proximal portion 22a and the first press-fitting portion 22b.

As shown in FIG. 3, openings of communication holes 22e which communicate with the inside of the valve housing 22 are formed in the outer peripheral surface of the valve housing 22. A dust collection filter 29 is fitted onto the valve housing 22.

As shown in FIG. 4B, when the first press-fitting portion 22b is press-fitted into the bottom portion 110, the outer peripheral surface of the first press-fitting portion 22b is press-joined to the inner peripheral surface of the bottom portion 110 over the entire circumference, whereby a press-fitted part having a contact length A1 is formed.

The valve body member 24 is made of a magnetic material such as ion or an iron alloy. The valve body member 24 is disposed on an upper side of the valve housing 22. The valve body member 24 has a shaft portion 24a which is circular in cross section and a valve body 24b which is a spherical body held by a lower end portion of the shaft portion 24a.

The outer diameter of the shaft portion 24a is smaller than that of the valve housing 22. A lower end portion of the shaft portion 24a is reduced in diameter and inserted into the valve housing 22. An upper end surface of the shaft portion 24a is formed with a spring housing hole 24c which is cylindrical and has a bottom.

The valve body 24b is held by the lower end portion of the shaft portion 24a so that a part of the valve body 24b protrudes from the lower end surface of the shaft portion 24a. The valve body 24b is inserted into a recess portion which is formed in the lower end surface of the shaft portion 24a. The valve body 24b is held by the shaft portion 24a by plastically deforming and clamping the portion outside the recess portion to the valve body 24b.

The return spring 25 is a coil spring and is housed in the spring housing hole 24c of the shaft portion 24a. A lower end portion of the return spring 25 abuts against the bottom surface of the spring housing hole 24c, and an upper end portion of the return spring 25 protrudes upward from the spring housing hole 24c.

The valve seat member 26 is disposed on a lower side of the valve body member 24 and is fitted into a lower portion of the valve housing 22. A flow passage 26a penetrates through a center portion of the valve seat member 26 in the up and down directions. The flow passage 26a is closed when the valve body 24b sits on a valve seat surface which is formed at an upper opening edge portion of the first flow passage 26a.

The fixed core 27 is made of a magnetic material and is disposed on an upper side of the valve body member 24. The lower end surface of the fixed core 27 abuts against the upper end portion of the return spring 25.

Since the return spring 25 is interposed between the fixed core 27 and the valve body member 24 in a compressed state, the valve body member 24 pushed down by the urging force of the return spring 25. When the solenoid 30 is excited, the fixed core 27 attracts upward the valve body member 24 serving as a movable core.

The cover member 28 has approximately the same shape as the cover member 18 of the normally open solenoid valve 10 (see FIG. 2). The cover member 28 has a housing portion 28a formed at an upper portion thereof, a second press-fitting portion 28b formed at a lower portion thereof, and a second valve guide portion 28c (see FIG. 4B) formed at an opening end portion thereof.

The housing portion 28a covers the fixed core 27 and the valve body member 24. An upper portion of the housing portion 28a is reduced in diameter and an upper portion of the fixed core 27 is fitted into the upper portion of the housing portion 28a, whereby the fixed core 27 is fixed to the housing portion 28a. Also, as shown in FIG. 4B, the second press-fitting portion 28b is fitted onto the cover attachment portion 22c of the valve housing 22 and press-fitted into the intermediate portion 120 of the attachment hole 100.

When the second press-fitting portion 28b is press-fitted into the intermediate portion 120, the outer peripheral surface of the second press-fitting portion 28b is press-joined to the inner peripheral surface of the intermediate portion 120 over the entire circumference, whereby a press-fitted part having a contact length A2 is formed.

In the normally closed solenoid valve 20, as in the normally open solenoid valve 10 (see FIG. 4A), the contact length A1 between the inner peripheral surface the attachment hole 100 and the first press-fitting portion 22b is smaller than the contact length A2 between the inner peripheral surface the attachment hole 100 and the second press-fitting portion 28b. Therefore, when the solenoid valve 20 is press-fitted into the attachment hole 100, the first press-fitting portion 22b starts to be fitted into the bottom portion 110 after the second press-fitting portion 28b started to be fitted into the intermediate portion 120.

In the above-described normally closed solenoid valve 20, when the solenoid 30 (see FIG. 1) that surrounds the solenoid valve 20 is excited, the fixed core 27 shown in FIG. 3 attracts the valve body member 24 and thereby moves the valve body member 24 upward. As a result, the valve body 24b is separated from the valve seat member 26 and the flow passage 26a is thereby opened.

When the excitation of the solenoid 30 is stopped, the valve body member 24 is pushed back downward by the urging force of the return spring 25, whereby the valve body 24b comes to sit on the valve seat surface of the valve seat member 26 and the flow passage 26a is closed.

Next, description will be given on steps of attaching the solenoid valves 10 and 20 to the base body 1 in a method for manufacturing the vehicle brake hydraulic pressure control apparatus U.

In the vehicle brake hydraulic pressure control apparatus U according to the first embodiment, as shown in FIG. 1, the normally open solenoid valve 10 and the normally closed solenoid valve 20 are approximately the same in external shape and are attached to the base body 1 according to the same procedure. Therefore, the following description will be directed to the step of attaching the normally open solenoid valve 10 to the base body 1, and description on the step of attaching the normally closed solenoid valve 20 to the base body 1 will be omitted.

When the solenoid valve 10 is inserted into the attachment hole 100 with the insertion portion 12 leading as shown in FIG. 5A, the solenoid valve 10 is moved downward (i.e., toward the inner side of the base body 1) while the second valve guide portion 18c is guided by the inner peripheral surface of the attachment hole 100 and the second press-fitting portion 18b is guided by the second hole guide portion 160.

Then, the bottom edge of the second press-fitting portion 18b abuts against the top edge of the intermediate portion 120, and the second press-fitting portion 18b is placed at a press-fitting start position.

When the second press-fitting portion 18b has been placed at the press-fitting start position, the first press-fitting portion 12b has not reached the bottom portion 110 yet and only the proximal portion 12a is inserted in the bottom portion 110.

As the solenoid valve 10 is pushed down further, as show in FIG. 5B, the second press-fitting portion 18b is press-fitted into the intermediate portion 120 and a press-fitted part is formed between the outer peripheral surface of the second press-fitting portion 18b and the inner peripheral surface of the intermediate portion 120.

The solenoid valve 10 is pushed down while the second press-fitting portion 18b is fitted into the intermediate portion 120, whereby the solenoid valve 10 is moved downward while the first valve guide portion 12d is guided by the inner peripheral surface of the attachment hole 100 and the first press-fitting portion 12b is guided by the first hole guide portion 150.

Then, the bottom edge of the first press-fitting portion 12b abuts against the top edge of the bottom portion 110, and the first press-fitting portion 12b is placed at a press-fitting start position (see FIG. 5B).

As the solenoid valve 10 is pushed down further, as show in FIG. 4A, the first press-fitting portion 12b is press-fitted into the bottom portion 110 and a press-fitted part is formed between the outer peripheral surface of the first press-fitting portion 12b and the inner peripheral surface of the bottom portion 110.

Then, the solenoid valve 10 is moved until a preset displacement amount (insertion distance) is attained, and thereby the solenoid valve 10 is press-fitted into the attachment hole 100. Subsequently, the opening edge portion 140 of the attachment hole 100 is plastically deformed inward to thereby clamp the solenoid valve 10 by the inner peripheral surface of the attachment hole 100, to thereby prevent the solenoid valve 10 from coming off the base body 1.

Thus, the work of attaching the solenoid valve 10 to the base body 1 is completed, and the two press-fitted parts seal the space between the attachment hole 100 and the solenoid valve 10 liquid-tightly.

Next, description will be given on a method for managing the press-fitting state of the respective press-fitting portions 12*b*, 18*b* into the attachment hole 100 during the method for manufacturing the vehicle brake hydraulic pressure control apparatus U.

Also, with regard to the managing method, the normally open solenoid valve 10 and the normally closed solenoid valve 20 (see FIG. 1) are managed according to the same procedure. Therefore, the following description will be directed to the managing method for the normally open solenoid valve 10, and description on the managing method for the normally closed solenoid valve 20 will be omitted.

In the managing method, at the steps of press-fitting the press-fitting portions 18*b*, 12*b* into the attachment hole 100 sequentially (see FIG. 4A), a downward displacement amount of the solenoid valve 10 and a press-fitting load applied to the solenoid valve 10 are measured. FIG. 6 is a graph showing a relationship between the displacement amount of the solenoid valve 10 and the press-fitting load applied to the solenoid valve 10.

As seen from FIG. 5A, no press-fitting load is applied to the solenoid valve 10 until the second press-fitting portion 18*b* reaches its press-fitting start position (P1 in FIG. 6). As the second press-fitting portion 18*b* is press-fitted into the intermediate portion 120 as shown in FIG. 5B, the press-fitting load increases in proportion to the displacement amount of the solenoid valve 10 (from P1 to P2 in FIG. 6).

As the first press-fitting portion 12*b* is press-fitted into the bottom portion 110 as as shown in FIG. 4A after reaching its press-fitting start position (P2 in FIG. 6), a pressing load for press-fitting the first press-fitting portion 12*b* into the bottom portion 110 is applied to the solenoid valve 10 and the press-fitting load increases in proportion to the displacement amount of the solenoid valve 10 (from P2 to P3 in FIG. 6).

As this occurs, the second press-fitting portion 18*b* continues to be press-fitted into the intermediate portion 120. Therefore, the press-fitting load that is the sum of the press-fitting load for press-fitting the second press-fitting portion 18*b* into the intermediate portion 120 and the press-fitting load for press-fitting the first press-fitting portion 12*b* into the bottom portion 110 is applied to the solenoid valve 10. That is, the gradient of the line increases when the displacement amount of the solenoid valve 10 passes the press-fitting start position of the first press-fitting portion 12*b* (P2 in FIG. 6). In this manner, the increase rate of the press-fitting load applied to the solenoid valve 10 with respect to the displacement amount of the solenoid valve 10 increases each time the press-fitting portion 18*b* or 12*b* starts to be press-fitted.

In the above-described managing method, the press-fitting state of the second press-fitting portion 18*b* can be managed based on a first measurement value that is a press-fitting load measured when only the second press-fitting portion 18*b* starts to be press-fitted into the attachment hole 100 (P1 in FIG. 6).

Furthermore, a second measurement value is obtained that is a press-fitting load measured when the first press-fitting portion 12*b* starts to be press-fitted into the attachment hole 100 (P2 in FIG. 6) following the second press-fitting portion 18*b*. The first measurement value and the second measurement value are compared with each other. If a difference (variation amount) between the first and second measurement values is larger than or equal to a preset value, it means that the first and second press-fitting portions 12*b* and 18*b* have been press-fitted into the attachment hole 100 at the preset press-fitting load.

In this manner, the above-described managing method makes it possible to manage the press-fitting state of the press-fitting portions 18*b*, 12*b* into the attachment hole 100 based on a variation of the press-fitting load.

After the start of press-fitting of the first press-fitting portion 12*b* (P2 in FIG. 6), the press-fitting load for press-fitting the first press-fitting portion 12*b* into the bottom portion 110 can be calculated by subtracting an estimated press-fitting load variation (indicated by a broken line segment in FIG. 6) for press-fitting the second press-fitting portion 18*b* into the intermediate portion 120 from the press-fitting load (indicated by a solid line segment in FIG. 6) applied to the solenoid valve 10.

In the above-described vehicle brake hydraulic pressure control apparatus U, as shown in FIGS. 4A and 4B, the two press-fitting portions 18*b*, 12*b* (28*b*, 22*b*) are provided on the outer peripheral surface of the solenoid valve 10 (20) so as to be spaced from each other in the hole axis direction. The press-fitting portions 18*b*, 12*b* (28*b*, 22*b*) are press-fitted into the attachment hole 100 sequentially, whereby the space between the attachment hole 100 and the solenoid valve 10 (20) can be sealed reliably by the two press-fitted parts.

The two press-fitting portions 18*b*, 12*b* (28*b*, 22*b*) are disposed across the communication holes 12*e* (22*e*). Therefore, sealing can be made reliably around the regions where the communication holes 12*e* (22*e*) of the solenoid valve 10 (20) communicate with the fluid line 1*d* of the base body 1.

The cover member 18 (28) is press-joined to the valve housing 11 (22) when a press-fitting load is applied to the solenoid valve 10 (20) to press-fitting it into the attachment hole 100. Therefore, the cover member 18 (28) can be fixed to the valve housing 11 (22) reliably without fixing by means of welding or the like.

In the method for manufacturing the vehicle brake hydraulic pressure control apparatus U, the space between the attachment hole 100 and the solenoid valve 10 (20) can be sealed by the two press-fitted parts merely by the work of moving the solenoid valve 10 (20) inserted in the attachment hole 100 toward the inner side of the base body 1. As a result, the process for manufacturing the vehicle brake hydraulic pressure control apparatus U can be simplified.

Also, since the two press-fitting portions 18*b*, 12*b* (28*b*, 22*b*) start to be press-fitted at different time points, the press-fitting load applied to the solenoid valve 10 (20) is dispersed. As a result, the solenoid valve 10 (20) can be press-fitted into the attachment hole 100 smoothly.

Also, the first press-fitting portion 12*b* (22*b*) starts to be press-fitted into the attachment hole 100 on the inner side of the base body 1 after the second press-fitting portion 18*b* (28*b*) starts to be press-fitted into the attachment hole 100 on the upper surface 1*a* side of the base body 1. As a result, the inner-side portion of the solenoid valve 10 (20) can be press-fitted into the attachment hole 100 while the portion, on the upper surface 1*a* side, of the solenoid valve 10 (20) is kept stable with respect to the attachment hole 100.

Immediately before being press-fitted, the solenoid valve 10 (20) is guided by the hole guide portion 150, 160 and the valve guide portion 12*d*, 18*c* (22*d*, 28*c*). As a result, the solenoid valve 10 (20) can be introduced to each press-fitting region smoothly and hence can be press-fitted into the attachment hole 100 in a stable manner.

Furthermore, in the managing method during the method for manufacturing the vehicle brake hydraulic pressure control apparatus U, the press-fitting states of the respective press-fitting portions 18*b*, 12*b* (28*b*, 22*b*) into the attachment hole 100 can be managed based on a variation of the press-fitting load. This makes it possible to seal the space between the attachment hole 100 and the solenoid valve 10 (20) reliably.

The first embodiment of the invention has been described above. However, the invention is not limited to the above-described first embodiment. The first embodiment can be modified as appropriate without departing from the spirit and scope of the invention.

In the first embodiment, as shown in FIG. 4A, the outer peripheral surface of the solenoid valve 10 is formed with the two press-fitting portions 18b, 12b so as to be spaced from each other in the hole axis direction. However, three or more press-fitting portions may be formed. Where three or more press-fitting portions are provided, it suffices that the contact lengths between the attachment hole 100 and at least two of the press-fitting portions be different from each other. That is, where three or more press-fitting portions are provided, it suffices that at least two of the press-fitting portions start to be press-fitted at different time points.

Although the cover member 18 is formed with the second press-fitting portion 18b in the first embodiment, the insertion portion 12 may be formed with a second press-fitting portion.

Figure 7A:
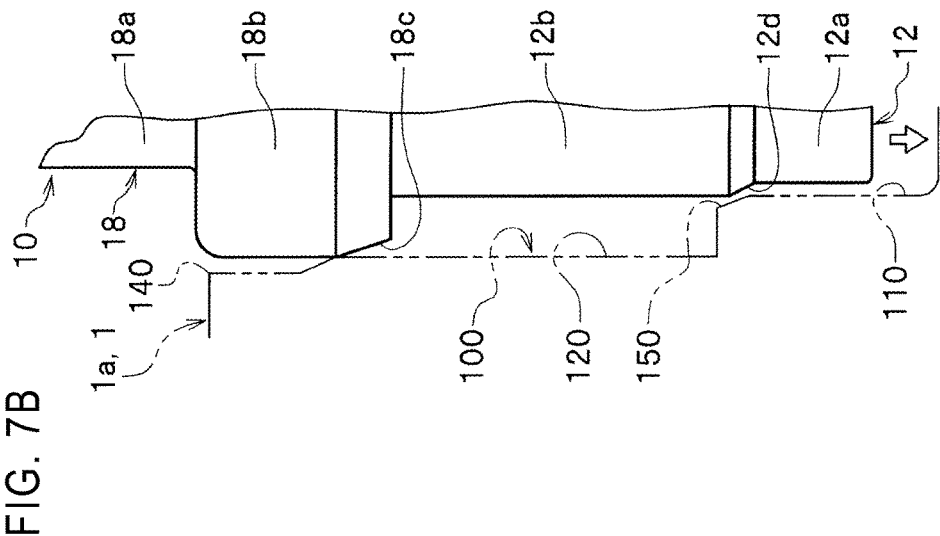
FIGS. 7A and 7B show another configuration according to the first embodiment.

Also, as shown in FIG. 7A, a modification may be made so that the contact length A2 between the inner peripheral surface of the attachment hole 100 and the second press-fitting portion 18b is larger than the contact length A1 between the inner peripheral surface of the attachment hole 100 and the first press-fitting portion 12b and is smaller than a value obtained by adding the contact length A1 and a length B1 of the first hole guide portion 150 in the hole axis direction. That is, settings may be made so as to satisfy A1<A2<(A1+B1).

Figure 7B:
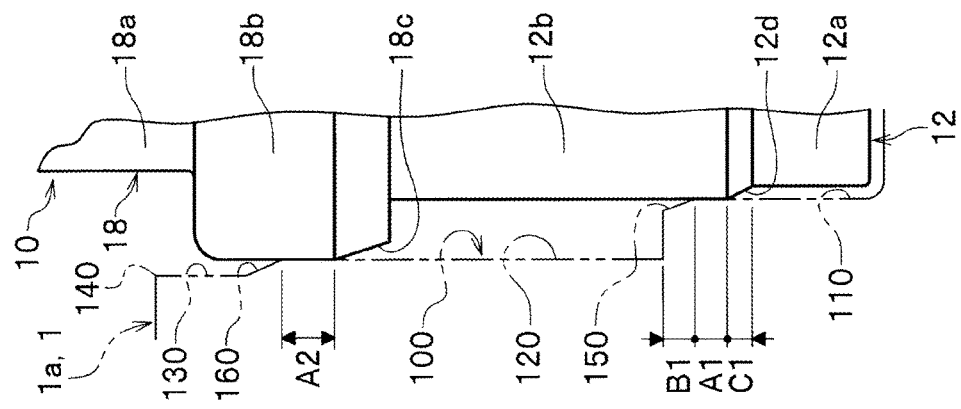

With this structure, as shown in FIG. 7B, the first press-fitting portion 12b is located in the first hole guide portion 150 when the second press-fitting portion 18b is placed at its press-fitting start position. Therefore, the second press-fitting portion 18b can be press-fitted into the attachment hole 100 while a lower portion of the solenoid valve 10 is kept stable with respect to the attachment hole 100.

Also, as shown in FIG. 7A, modification may be made so that the contact length A2 between the inner peripheral surface of the attachment hole 100 and the second press-fitting portion 18b is larger than the contact length A1 between the inner peripheral surface of the attachment hole 100 and the first press-fitting portion 12b and is smaller than a value obtained by adding the contact length A1 and a length C1 of the first valve guide portion 12d in the hole axis direction. That is, settings may be made so as to satisfy A1<A2<(A1+C1).

With this structure, as shown in FIG. 7B, the first valve guide portion 12d is located in the bottom portion 110 when the second press-fitting portion 18b is placed at its press-fitting start position. Therefore, the second press-fitting portion 18b can be press-fitted into the attachment hole 100 while the lower portion of the solenoid valve 10 is kept stable with respect to the attachment hole 100.

Second Embodiment

Figure 8A:
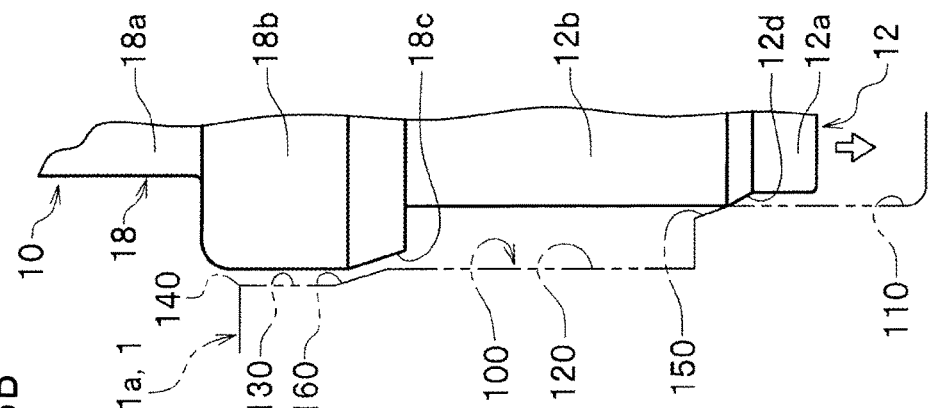
FIGS. 8A and 8B illustrate a manufacturing method according to a second embodiment.

A vehicle brake hydraulic pressure control apparatus, a method for manufacturing a vehicle brake hydraulic pressure control apparatus, and a managing method according to a second embodiment are different from those of the first embodiment in that as shown in FIG. 8A, the contact length A2 between the inner peripheral surface of the attachment hole 100 and the second press-fitting portion 18b is smaller than the contact length A1 between the inner peripheral surface of the attachment hole 100 and the first press-fitting portion 12b (that is, A1>A2).

Figure 8B:
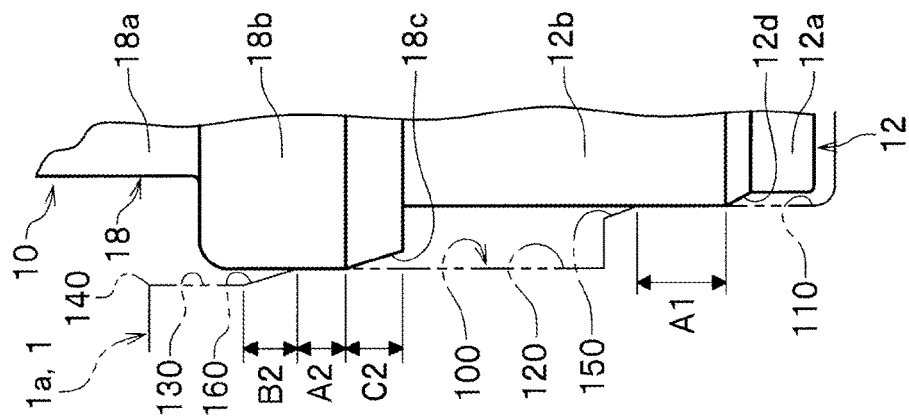

In the second embodiment, as the solenoid valve 10 is inserted into the attachment hole 100 of the base body 1 to press-fit the solenoid valve 10 into the attachment hole 100 of the base body 1, the first press-fitting portion 12b is first placed at its press-fitting start position as shown in FIG. 8B. As this occurs, the second press-fitting portion 18b has not reached the intermediate portion 120 yet.

As the solenoid valve 10 is further pushed downward, the first press-fitting portion 12b is press-fitted into the bottom portion 110 and then, the second press-fitting portion 18b is press-fitted into the intermediate portion 120.

Also, in the second embodiment, as shown in FIG. 8A, the contact length A1 between the inner peripheral surface of the attachment hole 100 and the first press-fitting portion 12b is larger than the contact length A2 between the inner peripheral surface of the attachment hole 100 and the second press-fitting portion 18b and is smaller than a value obtained by adding the contact length A2 and a length B2 of the second hole guide portion 160 in the hole axis direction. That is, A2<A1<(A2+B2).

With this structure, as shown in FIG. 8B, the second press-fitting portion 18b is located in the second hole guide portion 160 when the first press-fitting portion 12b is placed at its press-fitting start position. Therefore, the first press-fitting portion 12b can be press-fitted into the attachment hole 100 while an upper portion of the solenoid valve 10 is kept stable with respect to the attachment hole 100.

Also, as shown in FIG. 8A, the contact length A1 between the inner peripheral surface of the attachment hole 100 and the first press-fitting portion 12b is greater than the contact length A2 between the inner peripheral surface of the attachment hole 100 and the second press-fitting portion 18b and is smaller than a value obtained by adding the contact length A2 and a length C2 of the second valve guide portion 18c in the hole axis direction. That is, A2<A1<(A2+C2).

With this structure, as shown in FIG. 8B, the second valve guide portion 18c is located in the intermediate portion 120 when the first press-fitting portion 12b is placed at its press-fitting start position. Therefore, the first press-fitting portion 12b can be press-fitted into the attachment hole 100 while the upper portion of the solenoid valve 10 is kept stable with respect to the attachment hole 100.

In the second embodiment, the hole diameter of the intermediate portion 120 is larger than that of the bottom portion 110. However, the intermediate portion and the bottom portion may have the same hole diameter. In this case, the second press-fitting portion can be press-fitted into the intermediate portion through which the first press-fitting portion has already passed by setting the diameter of the second press-fitting portion to be larger than that of the first press-fitting portion.

What is claimed is:
1. A vehicle brake hydraulic pressure control apparatus, comprising:
  a base body; and
  a solenoid valve that is attached to an attachment hole which opens on one surface of the base body, wherein the attachment hole includes a bottom portion, an intermediate portion, a stepped portion, an entrance portion and an opening edge portion provided continuously in this order, the intermediate portion is formed on an upper side of the bottom portion, the intermediate portion has a diameter larger than a diameter of the bottom portion, the stepped portion is formed on an upper side of the intermediate portion, with the diameter of the intermediate portion larger than a diameter of the stepped portion, the entrance portion is formed on an upper side of the stepped portion and leads directly to the open edge portion having a same diameter as the entrance portion, and the diameter of the entrance portion being larger than the diameter of the stepped portion and the diameter of the intermediate portion, the opening edge portion opens on an upper surface of the base body and is formed on an upper side of the entrance portion, the opening edge portion has a diameter larger than the diameter of the stepped portion, and a plurality of press-fitting portions that are press-fitted to directly contact an inner peripheral surface of the attachment hole and are provided on an outer peripheral surface of the solenoid valve at an interval in a hole axis direction, the inner periphery surface of the attachment hole directly facing the outer peripheral surface of the solenoid valve, contact lengths, in the hole axis direction, between the inner peripheral surface of the attachment hole and two of the press-fitting portions are different from each other, wherein the solenoid valve includes:
   a valve housing that is inserted into the attachment hole, and
   a cylindrical cover member that covers the housing,
an opening end portion of the cover member is inserted into the attachment hole,
at least one of the press-fitting portions is formed on an outer peripheral surface of the cover member,
an outer peripheral surface of the press-fitting portion of the cover member is press-joined to directly contact the inner peripheral surface of the attachment hole, and
an inner peripheral surface of the press-fitting portion of the cover member is press-joined to directly contact an outer peripheral surface of the valve housing.

2. The apparatus according to claim 1, wherein
a communication hole that communicates with a fluid line of the base body opens on the outer peripheral surface of the solenoid valve, and
the two of the press-fitting portions are disposed across an opening portion of the communication hole.

3. The apparatus according to claim 1, wherein the contact length between the inner peripheral surface of the attachment hole and one, being located on a bottom-portion side of the attachment hole, of the two of the press-fitting portions is smaller than that between the inner peripheral surface of the attachment hole and the other, being located on an opening-portion side of the attachment hole, of the two of the press-fitting portions.

4. The apparatus according to claim 1, wherein an outer diameter of the cylindrical cover member is slightly larger than a hole-diameter of the attachment hole.

5. The apparatus of according to claim 1, wherein plurality of press-fitting portions comprises
   a first press-fitting portion with its outer peripheral surface press-fitted into the inner peripheral surface of the bottom portion of the attachment hole, a second press-fitting portion with its outer peripheral surface press-joined to the inner peripheral surface of the intermediate portion of the attachment hole over its entire circumference, the contact lengths include a first contact length A1 and a second contact length A2, the first contact length A1 being between the inner peripheral surface of the attachment hole and the first press-fitting portion, which is located on the bottom portion of the attachment hole, the second contact length A2 being between the inner peripheral surface of the attachment hole and the second press-fitting portion, which is located on an opening portion side of the attachment hole, and the first contact length A1 is smaller than the second contact length A2.

6. The apparatus according to claim 1, wherein
valve guide portions are provided on the outer peripheral surface of the solenoid valve, and
a diameter of each valve guide portion gets smaller as it goes from the corresponding press-fitting portion toward an inner side of the base body.

7. The apparatus according to claim 6, wherein
the contact length between the inner peripheral surface of the attachment hole and one of the two of the press-fitting portions
   is larger than that between the inner peripheral surface of the attachment hole and the other of the two of the press-fitting portions and
   is smaller than a value obtained by adding (i) the contact length between the inner peripheral surface of the attachment hole and the other of the two of the press-fitting portions and (ii) a length, in the hole axis direction, of the valve guide portion corresponding to the other of the two of the press-fitting portions.

8. The apparatus according to claim 1, wherein
a first hole guide portion is formed between the bottom portion and the intermediate portion, and
a second hole guide portion is formed between the intermediate portion and the entrance portion.

9. The apparatus according to claim 8, wherein
an inner peripheral surface of the first hole guide portion is a tapered surface with a diameter that increases from the bottom portion toward the intermediate portion.

10. The apparatus according to claim 9, wherein
an insertion portion of the solenoid valve is press-fitted into the attachment hole, which has a stepped cylindrical component with a diameter that increases step by step going upward,
the insertion portion has a proximal portion, a first press-fitting portion of the press fitting portions, formed on an upper side of the proximal portion, and a cover attachment portion formed on an upper side of the first press-fitting portion, and a first valve guide portion is formed between the proximal portion and the first press-fitting portion,
the first press-fitting portion is a portion which is press-fitted into the bottom portion of the attachment hole, and
openings of communication holes which communicate with an inside of the insertion portion are formed in an outer peripheral surface of the first press-fitting portion.

11. The apparatus according to claim 10, wherein
the outer diameter of the first press-fitting portion is larger than the hole diameter of the bottom portion, the first press-fitting portion is press-fitted into the bottom portion, such that an outer peripheral surface of the first press-fitting portion is press-joined to the inner peripheral surface of the bottom portion over an entire circumference which has a press-fitted part forming a first contact length (A1) of the contact lengths, and the press-fitted part seals a space between the outer peripheral surface of the first press-fitting portion and the inner peripheral surface of the bottom portion liquid-tightly.

12. The apparatus according to claim 11, wherein
the first valve guide portion is a portion which extends from a bottom edge of the first press-fitting portion to the top edge of the proximal portion, and
an outer peripheral surface of the first valve guide portion is a tapered surface with a diameter that decreases from the first press-fitting portion toward the proximal portion.

13. The apparatus according to claim 12, wherein
the press-fitting portion of the cover member is a second press-fitting portion of the press-fitting portions is formed on a lower side of a housing portion and is fitted onto the cover attachment portion of the insertion portion and press-fitted into the intermediate portion of the attachment hole.

14. A vehicle brake hydraulic pressure control apparatus, comprising:
a base body; and
a solenoid valve that is attached to an attachment hole which opens on one surface of the base body, wherein
a plurality of press-fitting portions that are press-fitted to directly contact an inner peripheral surface of the attachment hole are provided on an outer peripheral surface of the solenoid valve at an interval in a hole axis direction, the inner periphery surface of the attachment hole directly facing the outer peripheral surface of the solenoid valve,
contact lengths, in the hole axis direction, between the inner peripheral surface of the attachment hole and two of the press-fitting portions are different from each other,
wherein the solenoid valve includes:
a valve housing that is inserted into the attachment hole, and
a cylindrical cover member that covers the housing,
an opening end portion of the cover member is inserted into the attachment hole,
at least one of the press-fitting portions is formed on an outer peripheral surface of the cover member,
an outer peripheral surface of the press-fitting portion of the cover member is press-joined to directly contact the inner peripheral surface of the attachment hole, and
an inner peripheral surface of the press-fitting portion of the cover member is press-joined to directly contact an outer peripheral surface of the valve housing,
the attachment hole is a stepped cylindrical hole which has a bottom surface with a diameter that increases step by step toward an upper surface from an inner side of the base body,
the attachment hole has a bottom portion, an intermediate portion, an entrance portion, and an opening edge portion,
the intermediate portion is formed on an upper side of the bottom portion,
the entrance portion is formed on an upper side of the intermediate portion, and
the opening edge portion opens on the upper surface, a first hole guide portion is formed between the bottom portion and the intermediate portion,
a second hole guide portion is formed between the intermediate portion and the entrance portion,
a hole diameter of the intermediate portion is larger than that of the bottom portion,
an inner peripheral surface of the first hole guide portion is a tapered surface with a diameter that increases from the bottom portion toward the intermediate portion, and
a hole diameter of the entrance portion is larger than that of the intermediate portion,
an insertion portion is press-fitted into the attachment hole, which has a stepped cylindrical component with a diameter that increases step by step going upward,
the insertion portion has a proximal portion, a first press-fitting portion of the press fitting portions, formed on an upper side of the proximal portion, and a cover attachment portion formed on an upper side of the first press-fitting portion, and a first valve guide portion is formed between the proximal portion and the first press-fitting portion,
the first press-fitting portion is a portion which is press-fitted into the bottom portion of the attachment hole,
openings of communication holes which communicate with an inside of the insertion portion are formed in an outer peripheral surface of the first press-fitting portion,
the outer diameter of the first press-fitting portion is larger than the hole diameter of the bottom portion,
the first press-fitting portion is press-fitted into the bottom portion, such that an outer peripheral surface of the first press-fitting portion is press-joined to the inner peripheral surface of the bottom portion over an entire circumference which has a press-fitted part forming a first contact length (A1) of the contact lengths, and
the press-fitted part seals a space between the outer peripheral surface of the first press-fitting portion and the inner peripheral surface of the bottom portion liquid-tightly,
the first valve guide portion is a portion which extends from a bottom edge of the first press-fitting portion to the top edge of the proximal portion,
an outer peripheral surface of the first valve guide portion is a tapered surface with a diameter that decreases from the first press-fitting portion toward the proximal portion the press-fitting portion of the cover member is a second press-fitting portion of the press-fitting portions is formed on a lower side of a housing portion and is fitted onto the cover attachment portion of the insertion portion and press-fitted into the intermediate portion of the attachment hole,
an outer diameter of the second press-fitting portion is larger than that of the housing portion and is larger than the intermediate portion,
the second press-fitting portion is press-fitted into the intermediate portion, such that the outer peripheral surface of the second press-fitting portion is press-joined to an inner peripheral surface of the intermediate portion over an entire circumference which has a press-fitted part forming a second contact length (A2) of the contact lengths, and
the press-fitted part seals a space between the outer peripheral surface of the second press-fitting portion and the inner peripheral surface of the intermediate portion liquid-tightly.

15. The apparatus according to claim 14, wherein
the first contact length (A1) between the inner peripheral surface the attachment hole and the first press-fitting portion, which is located on the bottom portion of the attachment hole, is smaller than the second contact length (A2) between the inner peripheral surface of the attachment hole and the second press-fitting portion, which is located on an opening portion side of the attachment hole.

\* \* \* \* \*